United States Patent
Bodén

(10) Patent No.: US 11,603,778 B2
(45) Date of Patent: Mar. 14, 2023

(54) ENGINE SYSTEM AND METHOD FOR A VEHICLE

(71) Applicant: VOLVO TRUCK CORPORATION, Gothenburg (SE)

(72) Inventor: Roger Bodén, Kungsbacka (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/272,834

(22) PCT Filed: Sep. 4, 2018

(86) PCT No.: PCT/EP2018/073728
§ 371 (c)(1),
(2) Date: Mar. 2, 2021

(87) PCT Pub. No.: WO2020/048586
PCT Pub. Date: Mar. 12, 2020

(65) Prior Publication Data
US 2021/0310385 A1    Oct. 7, 2021

(51) Int. Cl.
*F01M 1/02*    (2006.01)
*F01M 1/12*    (2006.01)
(Continued)

(52) U.S. Cl.
CPC ............. *F01M 1/12* (2013.01); *F01M 1/16* (2013.01); *F01M 1/18* (2013.01); *F01M 9/108* (2013.01);
(Continued)

(58) Field of Classification Search
CPC ... F01M 1/02; F05D 2220/40; F05D 2260/98; F01D 25/18; F01P 2031/30
(Continued)

(56) References Cited

U.S. PATENT DOCUMENTS

2003/0230274 A1* 12/2003 Williams ............... F01M 1/10
                                                           123/196 R
2006/0065217 A1    3/2006 Ikegawa
(Continued)

FOREIGN PATENT DOCUMENTS

AT          500388 A2    12/2005
CN       101890902 A    11/2010
(Continued)

OTHER PUBLICATIONS

International Search Report and Written Opinion dated May 10, 2019 in corresponding International PCT Application No. PCT/EP2018/073728, 14 pages.
(Continued)

*Primary Examiner* — Long T Tran
*Assistant Examiner* — James J Kim
(74) *Attorney, Agent, or Firm* — Venable LLP; Jeffri A. Kaminski

(57) ABSTRACT

The present disclosure relates to an engine system (1) for a vehicle (100), comprising, an internal combustion engine (10), a lubrication system (20) arranged to lubricate the internal combustion engine (10) and a first lubrication pump (21) arranged to supply lubricant to the lubrication system (20). The first lubrication pump (21) is configured to be powered by an auxiliary power source (40), wherein the lubrication system (20) is further arranged to supply lubricant to at least one auxiliary component (30, 31) of the engine system (1) which requires to be lubricated when in use, and wherein the lubrication system (20) comprises at least one valve (23, 25) for selectively shutting off lubricant supply to the at least one auxiliary component (30, 31). The present disclosure also relates to a vehicle (100), to a method for controlling lubricant supply to an auxiliary component (30, 31) and to a control unit (70).

16 Claims, 3 Drawing Sheets

(51) Int. Cl.
*F01M 1/16* (2006.01)
*F01M 1/18* (2006.01)
*F01M 9/10* (2006.01)
*F02C 6/12* (2006.01)
*F02C 7/06* (2006.01)
*F02C 7/28* (2006.01)
*F02N 11/08* (2006.01)

(52) U.S. Cl.
CPC ............... *F02C 6/12* (2013.01); *F02C 7/06* (2013.01); *F01M 2001/123* (2013.01); *F02C 7/28* (2013.01); *F02N 11/0814* (2013.01); *F05D 2220/40* (2013.01); *F05D 2260/98* (2013.01)

(58) Field of Classification Search
USPC ........................................................ 123/196 R
See application file for complete search history.

(56) References Cited

U.S. PATENT DOCUMENTS

| | | | | |
|---|---|---|---|---|
| 2006/0070600 | A1 | 4/2006 | Hara | |
| 2008/0283337 | A1* | 11/2008 | Theobald | B60R 17/00 184/6.1 |
| 2010/0229824 | A1* | 9/2010 | Matsuo | F01M 1/02 123/196 R |
| 2012/0123666 | A1* | 5/2012 | Stoffels | F02N 11/0818 701/113 |
| 2012/0191322 | A1* | 7/2012 | Garrard | F02B 37/10 701/103 |
| 2014/0037235 | A1* | 2/2014 | Raby | F16C 33/04 29/898.01 |
| 2014/0290406 | A1* | 10/2014 | Hemphill | F02B 67/04 74/405 |
| 2014/0297045 | A1* | 10/2014 | Apostolides | F04B 53/20 700/282 |
| 2015/0139820 | A1* | 5/2015 | Leimann | F04B 23/08 417/53 |
| 2015/0260056 | A1* | 9/2015 | Medda | F02B 39/14 60/605.3 |

FOREIGN PATENT DOCUMENTS

| | | |
|---|---|---|
| DE | 10035049 A1 | 1/2002 |
| EP | 1640571 A1 | 3/2006 |
| EP | 3150811 A1 | 4/2017 |
| JP | 2014105665 A | 6/2014 |

OTHER PUBLICATIONS

International Preliminary Report on Patentability dated May 15, 2020 in corresponding International PCT Application No. PCT/EP2018/073728, 16 pages.

Chinese Office Action dated Aug. 10, 2022 in corresponding Chinese Patent Application No. 201880097144.X, 16 pages.

* cited by examiner

ENGINE SYSTEM AND METHOD FOR A VEHICLE

CROSS-REFERENCE TO RELATED APPLICATIONS

This application is a U.S. National Stage application of PCT/EP2018/073728, filed Sep. 4, 2018, and published on Mar. 12, 2020, as WO 2020/048586 A1, all of which is hereby incorporated by reference in its entirety.

TECHNICAL FIELD

The present invention relates to an engine system for a vehicle comprising an internal combustion engine and a lubrication system arranged to lubricate the internal combustion engine. The present invention also relates to a vehicle and to a method for controlling lubricant supply to at least one auxiliary component of an engine system. It further relates to a control unit for controlling lubricant supply to at least one auxiliary component of an engine system, to a computer program and a computer-readable medium.

The invention can be applied in heavy-duty vehicles, such as trucks, buses and construction equipment. Although the invention will be described with respect to a truck, the invention is not restricted to this particular vehicle, but may also be used in other vehicles, such as passenger cars, marine vessels etc.

BACKGROUND

Internal combustion engines (ICE) are one of the most common engine types for propelling vehicles of different kind. However, in recent years also hybrid engine systems have been more commonly used where the ICE is complemented with an additional traction motor, commonly an electrical motor, for propelling the vehicle. The hybrid engine can alternate between making use of the ICE or the electric motor, depending on the driving situation. It can also make use of both engines simultaneously to thereby maximize the power output.

Moreover, automatic start/stop systems for vehicle engines have also become a more common feature in modern vehicles. The systems may be used for temporarily turning off the ICE when the vehicle has stopped at e.g. a traffic light, followed by restarting the ICE shortly after when the vehicle drives away. In addition, the automatic start/stop systems may also be used for temporarily turning off the ICE of a hybrid engine system when only the electrical motor shall be used for propelling the vehicle.

Both of the above-mentioned technologies have been developed with the aim of improving vehicle efficiency and reducing energy consumption.

An ICE is usually provided with a lubrication system for lubricating and/or cooling certain components of the ICE. An engine-driven mechanical pump is usually used for pumping lubricant, commonly oil, into the lubrication system. With the move towards hybridization of vehicles, such as plug-in hybrid vehicles, where the driving distance of the electrical motor is substantial, the ICE of the hybrid engine system will be turned off for a large number of cycles, and at a decent long time at an OFF state. This may generate a drain problem in the engine's lubrication system since the mechanically driven pump is not activated when the ICE is turned off, and this in turn may lead to increased wear of certain components in the ICE. For example, it has been found that the wear of sliding bearings in the ICE is much larger at engine start up than during ICE running condition.

US2012/0191322 A1 discloses a procedure for startup and shutdown of an ICE with an electronically-controlled turbocharger. The startup and shutdown procedures are determined to provide the desired lubrication and cooling to the engine and the turbocharger components. The system may include an electric oil pump that can supply oil to the oil circuit in the engine and turbocharger independently of an engine-driven mechanical oil pump. There is however a strive towards further improving the lubrication and cooling of the ICE and its components, especially when the ICE is part of a hybrid engine system where the ICE will undergo a large number of start/stop cycles.

SUMMARY

An object of the invention is to provide an improved engine system for a vehicle and an improved method for controlling lubricant supply to at least one auxiliary component of an engine system for a vehicle. More particularly, an object of the invention is to increase the service life and reduce the environmental impact of an engine system for a vehicle.

According to a first aspect, the object is achieved by an engine system according to claim 1. According to a second aspect, the object is achieved by a vehicle according to claim 10. According to a third aspect, the object is achieved by a method according to claim 12. According to a fourth aspect, the object is achieved by a control unit according to claim 17. According to a fifth aspect, the object is achieved by a computer program according to claim 18. According to a sixth aspect, the object is achieved by a computer readable medium according to claim 19.

According to the first aspect thereof, an engine system for a vehicle is provided, said engine system comprising an internal combustion engine, a lubrication system arranged to lubricate the internal combustion engine and a first lubrication pump arranged to supply lubricant to the lubrication system. The first lubrication pump is configured to be powered by an auxiliary power source, wherein the lubrication system is further arranged to supply lubricant to at least one auxiliary component of the engine system which requires to be lubricated when in use, and wherein the lubrication system comprises at least one valve for selectively shutting off lubricant supply to the at least one auxiliary component.

By the provision of an engine system as provided herein, the service life of the internal combustion engine can be increased whilst reducing the environmental impact by the vehicle. More particularly, it has been found that certain components of the ICE, and components connected to the ICE, may suffer from an increased wear when the ICE is undergoing a large number of start/stop cycles. Therefore, by providing the first lubrication pump and drive the pump by an auxiliary power source, the lubrication system can be supplied with lubricant also when the ICE is in an OFF state. The auxiliary power source for the first lubrication pump is herein defined as a power source which is different from the ICE's crankshaft. Thus, the first lubrication pump is not powered by directly transferred power from the ICE's crankshaft. By using the first lubrication pump when the ICE is in an OFF state, i.e. turned off, the risk of drainage in the lubrication system will be decreased. Thereby, the lubrication system can be kept filled during ICE OFF state and therefore maintain a hydraulic intact condition when the ICE is restarted. This may reduce the time needed for increasing the lubricant pressure in the lubrication system when the ICE is turned on, and due to this, ICE components can be saved from excessive wear due to lack of lubrication and/or cooling.

Furthermore, it has also been found that it may be advantageous to not lubricate and/or cool certain components when the ICE is turned off in order to protect the exhaust aftertreatment system (EATS). Therefore, the engine system of the present invention also comprises at least one valve for selectively shutting off lubricant supply to at least one auxiliary component which requires to be lubricated when the ICE is running, i.e. in use. For example, lubricant may leak into the EATS via some auxiliary components if the lubrication system is pressurized at ICE OFF state. Therefore, by providing the at least one valve such leakage may be avoided, and thus the performance of the EATS will not be negatively affected. Lubricant, commonly oil, leaking into the EATS may namely impair the exhaust aftertreatment process. In fact, this may lead to combustion instability, EATS premature ash loading and chemical degeneration.

Optionally, the at least one auxiliary component may be at least one of the following: a turbocharger connected to the internal combustion engine, a turbo compound connected to the internal combustion engine, an air compressor connected to the internal combustion engine, an exhaust brake system, a piston cooling system and a power take off (PTO). For example, if the turbine of a turbocharger and/or a turbo compound is not rotating at a certain rotation speed whilst the lubrication system is also pressurized, it may leak lubricant. Hence, by providing the at least one valve and selectively shutting off lubricant supply to e.g. the turbocharger, unwanted leakage therefrom and into the EATS caused by impaired sealing of the turbocharger at ICE OFF state may be avoided.

Optionally, the at least one auxiliary component may comprise a dynamic sealing for avoiding lubricant leakage when the at least one auxiliary component is running. A dynamic sealing means a sealing which requires a certain rotation speed in order to function properly. Purely by way of example, a turbocharger and/or a turbo compound may be provided with a dynamic sealing.

Optionally, the first lubrication pump may be an electrically powered pump. Still optionally, the auxiliary power source may be at least one electrical storage system, such as a battery. Alternatively, or as a complement, the at least one electrical storage system may comprise a capacitor.

Optionally, the engine system may further comprise a second lubrication pump for supplying lubricant to the lubrication system, the second lubrication pump being configured to be powered by power transferred directly from a cranking motion by the internal combustion engine's crankshaft. For example, the second lubrication pump may be a mechanical ICE-driven pump, and may in some embodiments be regarded as the main pump for the lubrication system which is meant to pressurize the lubrication system when the ICE is turned on and running. Still optionally, the maximum power output of the first lubrication pump may be lower than the maximum power output of the second lubrication pump. In fact, pressure provided to the lubrication system during ICE OFF state may not be as high as when the ICE is running. As an example, the pressure provided at ICE OFF state may only be increased to a level so that the pressure build up when the ICE is restarted is shortened, and thereby excessive component wear due to lack of lubricant may be avoided. Sliding bearings of the ICE may be damaged if there are no oil film in-between its sliding surfaces when the sliding bearing starts to rotate at engine start up. By maintaining a certain level of pressure in the lubrication system during ICE OFF state, the oil film can be maintained, or at least the time for building up the oil film can be shortened. By the fact that the first lubrication pump may have a lower maximum power output with respect to the second lubrication pump, a more cost-efficient engine system may also be provided.

Optionally, the engine system may be a hybrid engine system which further comprises an additional traction motor for propelling said vehicle, such as an electrical motor. More particularly, the ICE of a hybrid engine system, such as a plug-in hybrid engine system, may likely experience a large number of start/stop cycles, and may therefore be more vulnerable if the lubrication system is not pressurized during the start/stop cycles. Hence, by pressurizing the lubrication system at ICE OFF state, the service life of the ICE may be increased, whilst also the EATS can be protected from being contaminated by lubricant leakage.

Optionally, the engine system may further comprise an automatic start/stop system for temporarily turning off and restarting the internal combustion engine during use of the vehicle.

Optionally, the first lubrication pump may be fluidly connected to a lubricant reservoir. For example, the fluid connection may be provided by the use of pipes between the reservoir and the pump. Still optionally, the pipe may be connected to the reservoir by the use of a quick-release coupling which does not require any specific tools for applying the coupling, more than just pressing the coupling portion of the pipe onto a matching coupling portion on the reservoir. Thereby, the first lubrication pump may be easily integrated with an already existing reservoir which comprises such a quick release coupling portion.

According to the second aspect thereof, the object is provided by a vehicle comprising the engine system according to any one of the embodiments of the first aspect of the invention. It shall be noted that all embodiments of the second aspect of the invention are applicable to all of the embodiments of the first aspect of the invention, and vice versa, unless explicitly stated otherwise. The advantages provided by the second aspect of the invention are also largely analogous to the advantages provided with respect to the first aspect of the invention.

Optionally, the vehicle may be any one of a truck, a bus and a construction equipment vehicle.

According to the third aspect thereof, the object is provided by a method for controlling lubricant supply to at least one auxiliary component of an engine system for a vehicle according to any one of the embodiments of the first aspect, wherein the method comprises at least the following step:

closing the at least one valve when the lubrication system is pressurized by the first lubrication pump, and the internal combustion engine is either turned off, or has been turned off for a predetermined period of time.

It shall be noted that all embodiments of the third aspect of the invention are applicable to all of the embodiments of the first and second aspect of the invention, and vice versa, unless explicitly stated otherwise. The advantages provided by the third aspect of the invention are also largely analogous to the advantages provided with respect to the first and second aspect of the invention.

Optionally, the method may further comprise that a rotation speed of the at least one auxiliary component has decreased to a predetermined rotation speed threshold value before the at least one valve is closed. More particularly, and as indicated hereinabove, the sealing function of some auxiliary components may correlate to the rotation speed of the component, such as the rotation speed of the turbine in a turbocharger. Thereby, the auxiliary component may benefit from being provided with lubricant also during a certain time period starting from when the ICE has been turned off, whereby the time period may be a predetermined time period and/or depend on the time it takes for the auxiliary component's rotation speed to decrease to a specific predetermined rotation speed threshold value. When either one of the predetermined time period has lapsed or the rotation speed has decreased to its threshold value, the at least one valve is closed.

Optionally, the method may further comprise the following step:
  opening the at least one valve when said internal combustion engine is started.

Thereby, when the auxiliary component is started after it has been turned off, it can be lubricated and/or cooled again by the lubrication system.

Optionally, the method may further comprise the following step:
  activating the first lubrication pump to thereby pressurize the lubrication system when said internal combustion engine is turned off.

Still optionally, the first lubrication pump may be activated when the internal combustion engine is turned off by an automatic start/stop system of said engine system.

According to the fourth aspect thereof, the object is provided by a control unit for controlling lubricant supply to at least one auxiliary component of an engine system for a vehicle, wherein the control unit is configured for performing the steps of the method according to any one of the embodiment of the third aspect of the invention. It shall be noted that all embodiments of the fourth aspect of the invention are applicable to all of the embodiments of the first, second and third aspects of the invention, and vice versa, unless explicitly stated otherwise. The advantages provided by the fourth aspect of the invention are also largely analogous to the advantages provided with respect to the first, second and third aspects of the invention.

According to the fifth aspect thereof, the object is provided by a computer program comprising program code means for performing the steps of any of the embodiments of the third aspect of the invention, when said program is run on a computer. It shall be noted that all embodiments of the fifth aspect of the invention are applicable to all of the embodiments of the first, second, third and fourth aspects of the invention, and vice versa, unless explicitly stated otherwise. The advantages provided by the fifth aspect of the invention are also largely analogous to the advantages provided with respect to the first, second, third and fourth aspects of the invention.

According to the sixth aspect thereof, the object is provided by a computer readable medium carrying a computer program comprising program code means for performing the steps of any of the embodiment of the third aspect of the invention, when said program product is run on a computer. It shall be noted that all embodiments of the sixth aspect of the invention are applicable to all of the embodiments of the first, second, third, fourth and fifth aspects of the invention, and vice versa, unless explicitly stated otherwise. The advantages provided by the sixth aspect of the invention are also largely analogous to the advantages provided with respect to the first, second, third, fourth and fifth aspects of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
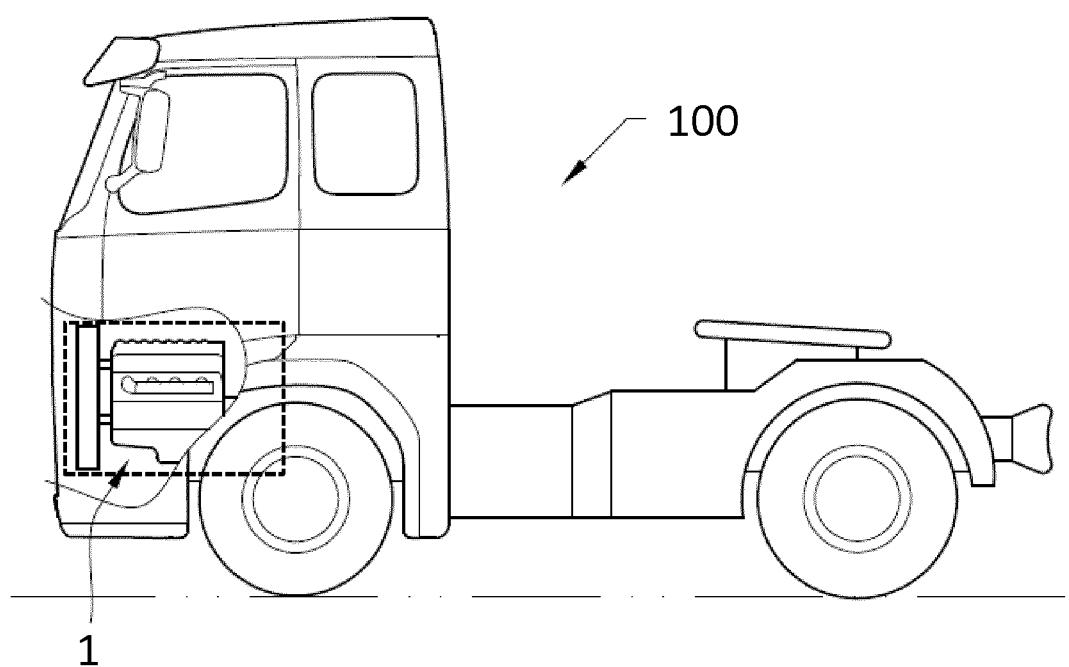
FIG. 1 depicts a truck comprising an engine system according to an example embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

With reference to FIG. 1, a vehicle in the form of a truck 100 is shown, comprising an engine system 1 (represented by the box with dashed lines) according to an example embodiment of the present invention. The engine system 1 is here provided at a front section of the truck 100, but could of course be placed elsewhere in the truck 100 depending on its design. The engine system 1 and its different components may also not necessarily be provided close to each other as indicated in FIG. 1, but could also be located remotely from each other in the truck 100.

Figure 2:
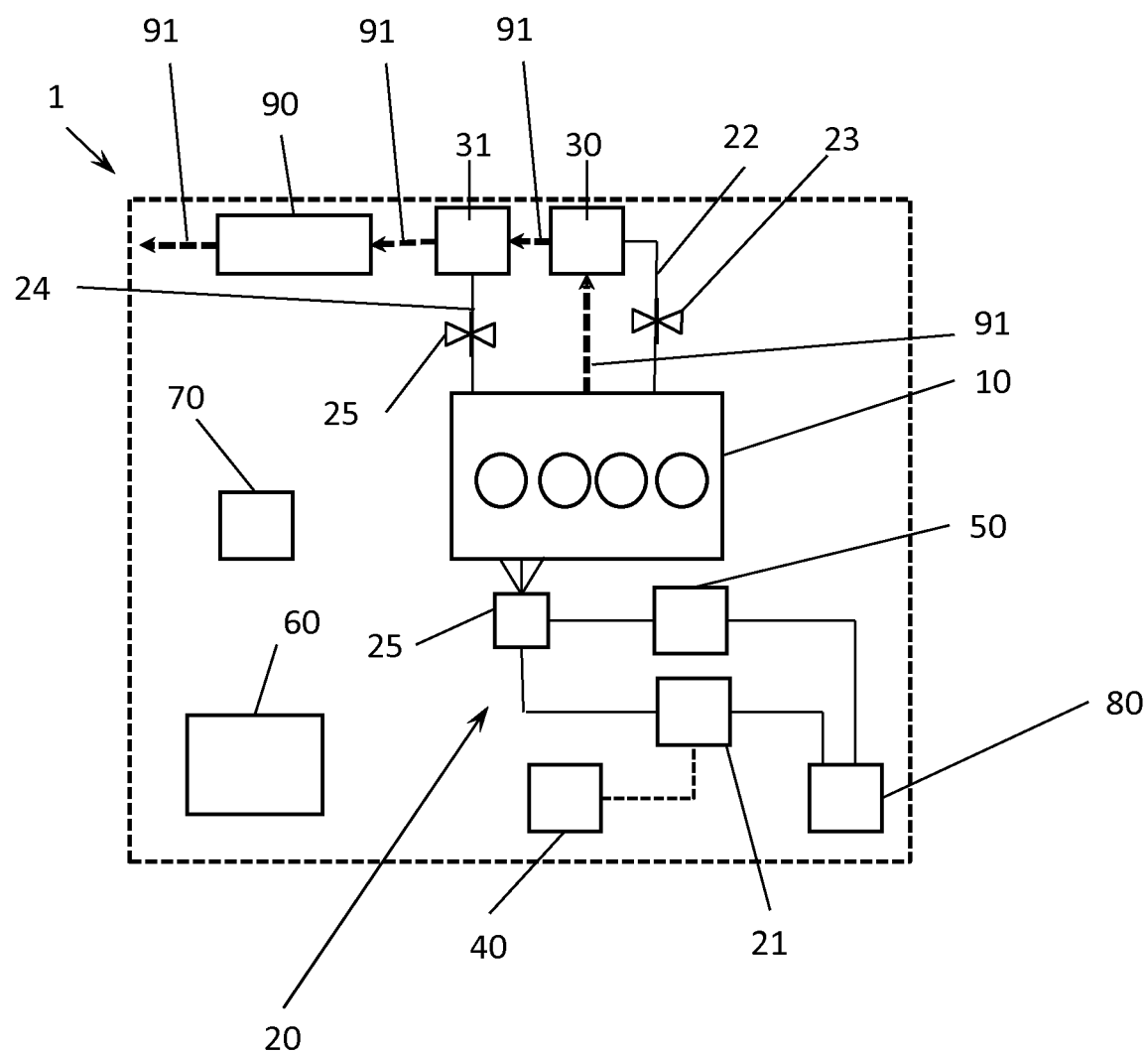
FIG. 2 depicts a schematic illustration of an engine system according to an example embodiment of the present invention.

With reference to FIG. 2, a schematic illustration of an example embodiment of an engine system 1 for a vehicle 100 is shown. The engine system 1 comprises an internal combustion engine 10, a lubrication system 20 arranged to lubricate the internal combustion engine 10 and a first lubrication pump 21 arranged to supply lubricant to the lubrication system 20. The lubrication system 20 is here an oil system for providing oil to the ICE 10, whereby the oil can be used for lubricating and cooling different parts of the ICE 10 when the ICE 10 is in use. For this purpose, and in this particular embodiment, a mechanical ICE-driven second lubrication pump 50 is provided and configured for supplying oil when the ICE 10 is turned on. The second lubrication pump 50 is configured to be powered by directly transferred power from the ICE's crankshaft (not shown). On the other hand, the first lubrication pump 21 is configured to be powered by an auxiliary power source 40, which in this example embodiment is a battery. Hence, the first lubrication pump 21 is in this embodiment an electrical pump driven by an electrical motor, such as an AC or DC motor. Both the electrical pump 21 and the ICE-driven pump 50 are fluidly connected to an oil reservoir 80. The fluid connections may be provided in the form of oil pipes which may be connected by respective quick-release coupling arrangements (not shown). The pumps 21 and 50 may be fluidly connected to the ICE 10 via an oil distributor 25.

The purpose of the first lubrication pump 21 is to be able to pressurize the lubrication system 20 also when the ICE 10 is turned off, for example when it is temporarily turned off during a start/stop cycle. As indicated hereinabove, such start/stop cycles may be more frequent if the engine system 1 is a hybrid engine system. The engine system 1 in FIG. 2 is a hybrid engine system and therefore also comprises an electrical motor 60 which is used for propelling the vehicle. By pressurizing the lubrication system 20 also when the ICE is temporarily turned off, excessive wear of certain ICE components can be reduced or avoided. Such components may as indicated hereinabove be sliding bearings of the ICE, but can also be any other components of the ICE 10.

The lubrication system 20 is further arranged to supply oil to at least one auxiliary component of the engine system 1 which requires to be lubricated when in use. In this example there are two auxiliary components; a turbocharger 30 and to a turbo compound 31. These two components are activated when exhaust gases from the ICE 10 are passing there-through, i.e. they are activated when the ICE is turned on and when the turbines (not shown) of the components are rotating. The exhaust flow is in FIG. 2 indicated by the dashed lines 91. The flow 91 exits the ICE 10 and passes through the turbocharger 30 and the turbo compound 31 before entering an EATS 90. When the ICE 10 is turned off the flow 90 will disappear, and therefore the components 30 and 31 will be deactivated, i.e. the rotation speed of the turbines will decrease, and eventually the turbines will stop rotating.

The turbocharger 30 and the turbo compound 31 are both configured such that they need to be activated in order to provide a proper sealing functionality, and thereby avoid oil leakage by the oil supplied by the lubrication system 20. More particularly, these components comprise dynamic seals which provide a sealing function when the turbines are rotating with a certain rotation speed. Once the rotation speed decreases to a certain level, the sealing function will be impaired.

For this reason, the lubrication system 20 further comprises a valve 23 for selectively shutting off oil supply 22 to the turbocharger 30 and another valve 25 for selectively shutting off oil supply 24 to the turbo compound 31. By this configuration, the oil supply to the turbocharger 30 and to the turbo compound 31 can be shut off when the ICE 10 is turned off, or when the ICE has been turned off for a certain time period. Thereby, unwanted oil leakage from these components, 30 and 31, can be avoided when the ICE 10 is turned off and when the first lubrication pump 21 is activated.

Unwanted oil leakage from these components, 30 and 31, may leak into the EATS 90, and this could negatively affect the exhaust aftertreatment process. By the configuration of the engine system 1 as defined herein, excessive wear of certain ICE components can be reduced or avoided whilst ensuring that the exhaust aftertreatment process is not negatively affected. Thus, the present invention may lead to that the service life of the ICE 10 will increase without negatively affecting the performance of the EATS 90.

The control of the lubrication system 20, e.g. activation/deactivation of the first lubrication pump 21 and opening/closing of the valves 23 and 25 may be performed by a control unit 70 of the engine system 1. The control unit 70 may comprise a computer program and computer readable medium according to the invention.

Turbocharger 30 and turbo compound 31 are well-known automotive components. The turbocharger uses energy from the exhaust gases to rotate its turbine, and this energy is then used for compression of intake air into the ICE. The turbo compound 31 also uses the energy from the exhaust gases, and its turbine is connected to and transfers energy to the engine transmission, thereby providing additional power to the drive axle. The turbo compound 31 is commonly provided downstream the turbo charger 30 and before the EATS 90, but could of course also be placed differently. The turbocharger 30 and the turbo compound 31 also do not necessarily need to co-exist in the engine system.

Figure 3:
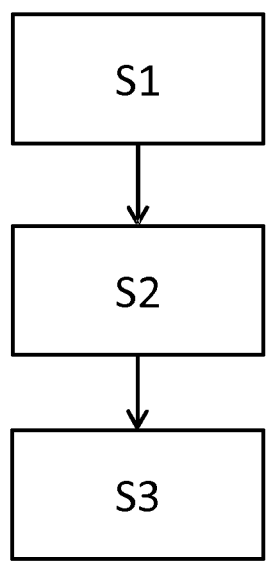
FIG. 3 depicts a flowchart of a method according to an example embodiment of the present invention.

With reference to FIG. 3, a flowchart of a method according to an example embodiment of the present invention is shown. The method is intended for controlling lubricant supply to at least one auxiliary component of an engine system for a vehicle according to the first aspect, wherein the method in this example embodiment comprise the following steps:

S1, activating the first lubrication pump 21 to thereby pressurize the lubrication system 20 when the internal combustion engine 10 is turned off, S2, closing the at least one valve, 23 and 25, when the lubrication system 20 is pressurized by the first lubrication pump 21, and when the internal combustion engine 10 is either turned off, or has been turned off for a predetermined period of time, and S3, opening the at least one valve, 23 and 25, when the internal combustion engine 10 is started.

Preferably, the first lubrication pump 21 is also deactivated in step S3 when the ICE 10 is restarted since there may be an ICE-driven pump 50 as e.g. shown in FIG. 2 which will be activated when the ICE 10 is turned on. Thus, the pump 21 only has to be activated when the ICE 10 is turned off, and therefore energy can be saved.

Figure 4:
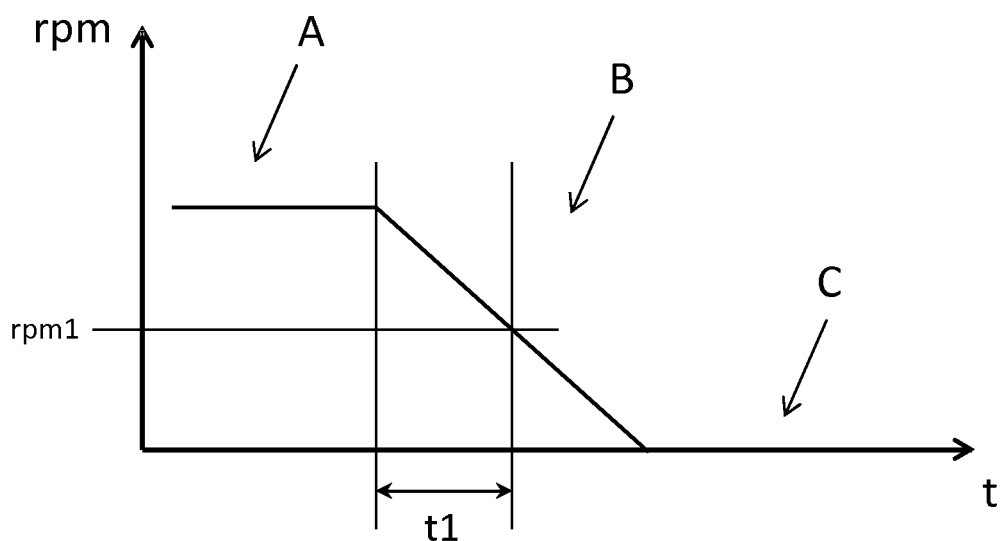
FIG. 4 depicts a diagram representing a shut off cycle of an auxiliary component of an ICE of an engine system according to an example embodiment of the present invention.

With reference to FIG. 4, a shut off cycle of a turbocharger 30 of an ICE 10 of an engine system 1 is shown. The y-axis represents the rotation speed (rpm) of the turbocharger's turbine and the t-axis represents time. When the turbocharger 30 is activated, its turbine rotates with a specific rotation speed as indicated in the phase A. When the ICE 10 is turned off, the rotation speed of the turbine will decrease, as shown in phase B, and eventually, after a certain time, the turbine's speed will be zero, as shown in phase C. The sealing performance of the turbocharger's dynamic sealing will decrease when also the rotation speed decreases in phase B. At a certain rotation speed, $rpm_1$, the sealing performance will be reduced such that there is a risk of oil leakage from the turbocharger 30. This is illustrated in FIG. 4 where it also can be seen that it will take the time period $t_1$ from when the ICE is turned off until the rotation speed $rpm_1$ is reached. The valve 23 provided for the turbocharger 30 may be closed at this point in time, $t_1$, or at an earlier point in time, such as directly when the ICE 10 is turned off. Hence, closing of the valve may be controlled by the control unit 70 by monitoring the rotation speed of the turbocharger 30, and/or by monitoring the time from when the ICE 10 is turned off. The aforementioned shut off cycle described with reference to FIG. 4 may of course also be applicable to other components of the engine system 1, such as for the turbo compound 31.

It is to be understood that the present invention is not limited to the embodiments described above and illustrated in the drawings; rather, the skilled person will recognize that many changes and modifications may be made within the scope of the appended claims.

The invention claimed is:

1. An engine system for a vehicle, comprising,
an internal combustion engine,
the internal combustion engine having a crankshaft, a lubrication system arranged to lubricate at least one sliding bearing of said internal combustion engine, a first lubrication pump arranged to supply lubricant to said lubrication system, wherein said first lubrication pump is configured to be powered by an auxiliary power source, wherein said lubrication system is further arranged to supply lubricant to at least one auxiliary component of said engine system which requires to be lubricated when in use, characterized in that, said lubrication system comprises at least one valve for selectively shutting off lubricant supply to said at least one auxiliary component in order to not lubricate and/or cool said at least one auxiliary component when the internal combustion engine is turned off, wherein said at least one auxiliary component is at least one of the following: a turbocharger connected to said internal combustion engine, a turbo compound connected to said internal combustion engine, and wherein said lubrication system is configured to maintain a certain level of pressure in the lubrication system by use of the first lubrication pump in order to lubricate the at least one sliding bearing when the internal combustion engine is turned off, wherein the engine system further comprises a second lubrication pump for supplying lubricant to the lubrication system, the second lubrication pump being configured to be powered by power transferred directly from a cranking motion by the internal combustion engine's crankshaft, wherein the lubrication system is configured so that the pressure provided to the lubrication system by the first lubrication pump when the internal combustion engine is turned off is lower than a pressure provided by the second lubrication pump when the internal combustion engine is running.

2. The engine system according to claim 1, wherein said at least one auxiliary component comprises a dynamic sealing for avoiding lubricant leakage when said at least one auxiliary component is running.

3. The engine system according to claim 1, wherein said first lubrication pump is an electrically powered pump.

4. The engine system according to claim 3, wherein said auxiliary power source is at least one electrical storage system, such as a battery.

5. The engine system according to claim 1, wherein said engine system is a hybrid engine system which further comprises an additional traction motor for propelling said vehicle, such as an electrical motor.

6. The engine system according to claim 5, further comprising an automatic start/stop system for temporarily turning off and restarting said internal combustion engine during use of said vehicle.

7. The engine system according to claim 1, wherein said first lubrication pump is fluidly connected to a lubricant reservoir.

8. A vehicle comprising the engine system according to claim 1.

9. The vehicle according to claim 8, wherein said vehicle is any one of a truck, a bus and a construction equipment vehicle.

10. A method for controlling lubricant supply to at least one auxiliary component of an engine system for a vehicle according to claim 1, said method comprising at least the following step:

activating said first lubrication pump to thereby pressurize said lubrication system when said internal combustion engine is turned off; and closing said at least one valve when said lubrication system is pressurized by said first lubrication pump, and said internal combustion engine is either turned off, or has been turned off for a predetermined period of time, wherein the pressure provided to the lubrication system by the first lubrication pump when the internal combustion engine is turned off is lower than a pressure provided by the second lubrication pump when the internal combustion engine is running.

11. The method according to claim 10, further comprising that a rotation speed of said at least one auxiliary component has decreased to a predetermined rotation speed threshold value before said at least one valve is closed.

12. The method according to claim 10, further comprising the following step:

opening said at least one valve when said internal combustion engine is started.

13. The method according to claim 10, wherein said internal combustion engine is turned off by an automatic start/stop system of said engine system.

14. A control unit for controlling lubricant supply to at least one auxiliary component of an engine system for a vehicle, wherein said control unit is configured for performing the steps of the method according to claim 10.

15. A computer program comprising program code for performing the steps of claim 10, when said program code is run on a computer.

16. A non-transitory computer readable medium carrying a computer program comprising program code for performing the steps of claim 10, when said program code is run on a control unit.

* * * * *